United States Patent Office 2,719,210
Patented Sept. 27, 1955

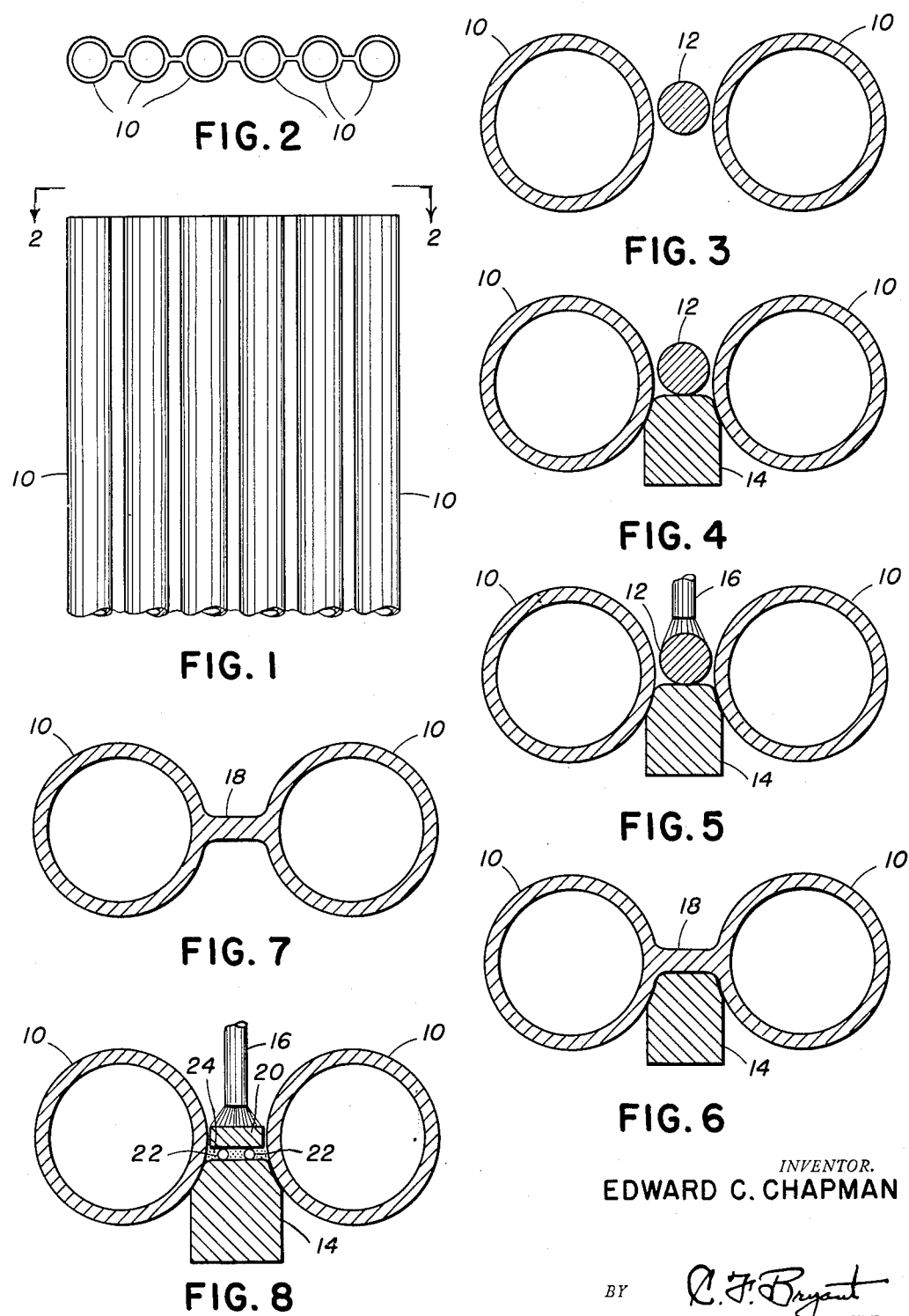

2,719,210

METHOD OF WELDING THIN WALLED TUBES FROM A SINGLE SIDE

Edward C. Chapman, Chattanooga, Tenn., assignor to Combustion Engineering Inc., New York, N. Y., a corporation of Delaware Application June 10, 1953, Serial No. 360,663

13 Claims. (Cl. 219—10)

This invention relates to a method of joining metallic members by welding from a single side and has particular application to the welding together of adjacent parallel, thin walled tubes to form impervious panels or walls.

The method of this invention provides positioning the members to be welded together so that the portions to be united lie in parallel spaced relation. Within this space is positioned metal, which may take the form of a bar or the like. This metal substantially fills the space and is of such a composition that it will unite with the metallic members and form a suitable weld. Positioned adjacent this metal is a backing or chilling strip which extends throughout the length of the metal and spans the space between the spaced members. This strip is so constructed and arranged that it will not become fused when the filler metal is in a molten state and is in direct contact with the strip for a limited period of time. An electric arc or other suitable localized welding heat is applied directly to the filler metal from the side opposite the backing strip causing the metal to be completely fused in the vicinity of this welding heat. The application of this heat is moved longitudinally of the space along the filler metal at a rate so that the portion of the bar in the vicinity of the heat is completely fused and united with the two metallic members but is not welded to and does not fuse the backing strip. After the weld is completed and the molten metal is solidified the backing strip is removed leaving an entirely satisfactory weld free of notches on the back side and one which was accomplished with complete penetration.

It is the object of this invention to provide an improved method of welding two metallic members together which is economically feasible and which produces an entirely satisfactory weld free of structural injury to these members.

The invention will be understood from the following description when considered in combination with the accompanying drawings forming a part thereof and in which:

Figure 1 is an elevational view of a water wall panel composed of thin walled tubes integrally welded together.

Figure 2 is an end view of the panel of Fig. 1 taken generally from line 2—2 of Fig. 1.

Figure 3 is a transverse sectional view of a pair of tubes in the panel of Fig. 1 showing the tubes before they are welded together and after the filler rod has been positioned therebetween.

Figure 4 is a view similar to that of Fig. 3 but after the copper backing strip has been placed in its operative position.

Figure 5 is a view similar to that of Fig. 4 but showing the position of the welding electrode during the welding operation.

Figure 6 shows the pair of tubes after the welding operation has been completed and prior to the removal of the copper backing strip.

Figure 7 is a view similar to that of Fig. 6 but after the copper backing strip has been removed.

Figure 8 is a view similar to that of Figure 5 but illustrating a modification of the welding method depicted in Figures 3 through 7.

Although the method of this invention will be described in connection with the formation of impervious water wall panels which are composed of integrally welded thin walled tubes and which are used in modern high capacity steam generators, it is to be understood that this is merely by way of illustration and is not to be taken as restrictive, the present method obviously having a broad application and being of utility in environments other than that herein employed to illustrate and explain the same.

The fabrication of water wall panels, such as illustrated in Figures 1 and 2 where thin walled steel tubes 10 are integrally joined by longitudinal welds extending throughout their length, presents a most difficult welding problem. Because of the thin walls of the tubes 10 the welding heat cannot be applied directly to the tubes since if this were done the tube wall would be considerably weakened and it would be impossible to prevent burning through the walls in performing the welding operation. Furthermore, in order for the fabrication of these panels to be economically feasible it is necessary that the welding operation be performed from a single side, and to provide a satisfactory weld, it is, of course necessary that complete penetration be achieved even though the welding operation is conducted from but one side.

Prior to the present invention the foregoing results had never been accomplished, to applicant's knowledge, and by the many welding experts of applicant's acquaintance, were thought to be impossible. With the method of this invention, however, these results are realized in a most expeditious and satisfactory manner.

Referring now specifically to Figures 1 through 7, in performing the method of this invention steel tubes 10, which in one installation have an outside diameter of approximately 1½ inches and a wall thickness of less than ⅜ of an inch, are positioned in longitudinally parallel spaced relation with the spacing of the aforementioned 1½ inch tubes being approximately ½ inch. Positioned within this space between adjacent tubes is steel rod or bar 12 which extends throughout the length of the space and is of sufficient size to substantially fill the space. Also positioned partially intermediate, tubes 10 but in spanning relation with the space between the tubes and in engagement with the tube walls and bar 12 is backing or chilling strip 14, which extends throughout the length of bar 12 and may advantageously be made of copper.

After backing strip 14 is in place a welding heat is applied directly to bar 12 from the side opposite the backing strip to completely fuse the bar in the vicinity of the application of this heat. The application of this heat is moved longitudinally along bar 12 at a rate such that the entire bar is progressively fused, with the molten metal becoming fused to tubes 10 but remaining independent of backing strip 14 as explained hereinafter.

As disclosed in Figure 5 the arc welding process may advantageously be used to fuse bar 12 and in such case electrode 16 is positioned adjacent the rod on the side opposite backing strip 14 and an arc is struck between the electrode and the bar 12.

During the welding operation, backing or chilling strip 14 appears to have a two-fold function which contributes to the success of applicant's method of welding together thin walled tubes with a continuous longitudinal weld. This backing strip of course forms a dam for the molten metal to retain it in the space between the spaced tubes 10 thereby allowing and providing for complete penetration. In addition the strip, which, as stated hereinbefore is in contact with the tubes, is effective to conduct heat from the tubes which would otherwise build up in the closed circumferential path of the tube wall and result in heating the tubes to such an extent as to make it difficult to perform the welding operation without burning through the tube wall. While the fact that the welding heat is applied to filler rod 12 and not to the tube is of the utmost importance in guarding against destruction of the tube wall, the last mentioned function of the backing strip is believed to contribute importantly to this result.

In performing the welding operation it is essential that the molten metal does not fuse the surface of the backing strip and thereby become welded thereto. It is also essential that the metal of bar 12 when in the molten state fuse the portion of the tube walls with which it is in contact sufficiently to become welded thereto but not burn through the tube wall. These results are satisfactorily accomplished when tubes 10 and rod 12 are made of steel and when backing strip 14 is made of copper. Because of the high melting point of copper, although somewhat lower than that of steel, together with its high thermoconductivity, the steel of rod 12 may be in contact with the surface of backing or chilling strip 14 for a limited period of time without fusing the surface of the copper strip and becoming welded thereto. Steel bar 12 prevents the arc or other welding heat from being applied directly to backing strip 14 thereby preventing this strip from being fused when the welding heat is being applied. Thus, by properly proportioning the filler strip 12 with the space to be filled, the intensity of the welding heat and its rate of travel along bar 12, it is possible to completely fuse this bar and cause the metal thereof to become sufficiently fused to the walls of adjacent tubes 10 but remain independent and free of backing strip 14. In this manner complete penetration is achieved and a weld is produced which is free of notches on its back side.

When the electric arc welding process is used the arc is struck against filler rod 12 and the pool of molten metal formed in the vicinity of the arc is made up of this filler rod and a portion of the metal of electrode 16. Due to the sensible heat of the molten pool the metal thereof is fused to the walls of the tubes 10, forming a satisfactory weld without the necessity of arcing to either of the tubes.

With the use of the copper backing strip it is essential that the strip not be fused during the welding operation not only because it is desired that this strip remain free of the tubes so that it can be removed and reused but also because it is essential, in order to avoid cracking of the weld, that no substantial amount of copper be picked up in the weld metal.

After the welding operation, disclosed in Figure 5, is completed tubes 10 are left integrally joined together by weld metal 18 as disclosed in Figure 6, and thereafter backing strip 14 is removed leaving the finished weld disclosed in Figure 7.

Figure 8 discloses a modified form of the method depicted in Figures 3 through 7. In this modification, in lieu of using a round filler rod intermediate adjacent tubes a metallic bar 20 of rectangular cross section is employed to span or substantially span the space between these tubes. The bar 20 is spaced from the upper surface of the copper backing strip 14 by two round steel spacer wires 22 and the space thus produced is filled with a suitable flux 24 which has the effect of largely eliminating the danger of the weld metal picking up copper during the welding operation. The standard commercial flux called melt or slag which is used in submerged arc welding has proven satisfactory for the purpose. This material is a slag which has been fused and granulated to specific sizes and during he welding operation, part of this metal is re-fused to give a slag which covers the weld with the unfused powdered portion covering the molten slag. This slag protects the molten weld metal from the air and may also introduce deoxidizers or alloys into the metal.

Since the round spacer wires 22 have only line contact with bar 20 and backing strip 14 a poor thermal connection is established between these elements which permits fusing the filler bar with a lower welding heat than if the bar was directly against the copper and also lessening the chance of melting the copper.

In this modified form of applicant's novel method the welding operation is carried out in the same manner as in the first mentioned form with the localized welding heat, which may be an electric arc, being applied directly to bar 20 from the side opposite the backing strip to completely fuse the bar in the vicinity of the application of this heat. The application of this heat is moved longitudinally along bar 20 at a rate such that the entire bar is progressively fused, with the molten metal becoming fused to tubes 10 but remaining independent of backing strip 14. After the welding operation is complete and the molten metal solidified the backing strip is removed leaving the finished weld shown in Figure 7.

It has been found desirable to minimize the thickness of the deposited metal which forms the web between the tubes in order to decrease the accuracy of control of the welding operation required to prevent burning through the tube walls. The less metal in this web, the less will be the danger of burning through the tube walls because it is the sensible heat of this metal when in the molten state that fuses the tube walls and a decrease in the quantity of this metal naturally reduces the sensible heat of the mass. Rectangular filler bar 20 readily lends itself to an accurate control of this deposited metal permitting the thickness of the web to be regulated in accordance with the strength requirements of the weld.

While in the illustrative organization here disclosed copper has been employed as the backing strip, other metals or alloys may equally well be used for this purpose; the requirements for a satisfactory backing strip being that it have a sufficiently high melting point and thermo-conductivity so that the metal of bar 12 and 20 may be in contact with it in a molten state for limited periods of time without becoming fused thereto.

With the method of this invention it is possible to weld together thin walled tubes and similar elements in a manner which is economically feasible and which produces an entirely satisfactory weld.

Inasmuch as various changes may be made in the method herein disclosed without departing from the principles of the invention it is to be understood that the invention is not to be limited except by the scope of the appended claims.

What I claim is:

1. A method of welding together two parallel, spaced, thin walled tubes of ferrous metal continuously along their adjacent longitudinal portions comprising substantially, completely spanning the space between said tubes with ferrous metal backed up by a backing strip extending longitudinally of said space and in spanning relation with said space, said backing strip being capable of being in direct contact with said ferrous metal for a limited period of time when said ferrous metal is in a molten state without itself becoming fused, applying a localized welding heat directly to the ferrous metal between the tubes from the side of the space opposite said backing strip, moving said localized welding heat longitudinally of said tubes along said ferrous metal at a rate such that the portion of the ferrous metal in the vincinity of the heat is completely fused and is united with the two tubes but remains substantially independent of said backing strip, and thereafter removing said backing strip.

2. A method of longitudinally joining a pair of thin walled steel tubes by welding which comprises positioning the tubes in parallel, relatively closely spaced relation, substantially competely spanning the space between said tubes with steel backed up by a copper backing strip extending longitudinally of said space and in spanning relation with said space, applying a localized welding heat directly to the steel from the side of the space opposite said backing strip, moving said localized welding heat longitudinally of said tubes along said steel at a rate such that a portion of the steel in the vicinity of the heat is completely fused and is united with the pair of tubes but remains substantially independent of said backing strip, and thereafter removing said backing strip.

3. A method of longitudinally joining a pair of thin walled steel tubes by welding which comprises positioning the tubes in parallel relatively closely spaced relation, substantially completely spanning the space between said tubes with steel backed up by a copper backing strip extending longitudinally of said space and in spanning relation with said space, striking an arc between a welding electrode and the steel at the side opposite said backing strip, moving said arc longitudinally of said tubes along said steel at a rate such that the portion of the steel in the vicinity of the arc is completely fused and is united with the two steel tubes but remains substantially independent of the backing strip, and thereafter removing said backing strip.

4. A method of welding together two parallel spaced thin walled steel tubes along their adjacent longitudinal portions comprising substantially completely spanning the space between said tubes with steel backed up by a metallic backing strip extending longitudinally of said space in spanning relation with said space and in contact with said pair of tubes, said strip being capable of conducting heat away from its surface which is adjacent said steel sufficiently rapidly to prevent fusion of said strip when the steel is in contact therewith in a fused state for a limited period of time, striking an arc between a welding electrode and the steel at the side opposite said backing strip, moving said arc longitudinally of said tubes along said steel at such a rate that the portion of the steel in the vicinity of the arc is completely fused and is united with the two steel tubes but remains substantially independent of the backing strip, and thereafter removing said strip.

5. A method of longitudinally joining a pair of thin walled steel tubes by welding which comprises positioning the tubes in parallel relatively closely spaced relation, positioning a steel filler bar of circular cross section intermediate said tubes and substantially filling the space therebetween, said filler bar being backed up by a metallic chilling strip which spans said space between the tubes and is constructed and arranged to conduct heat away from its surface which is adjacent said filler bar sufficiently rapidly to prevent fusion of said strip when the filler bar is in contact therewith in a fused state for a limited period of time, striking an arc between a welding electrode and the side of the filler bar opposite said chilling strip, moving said arc along said bar at a rate such that the portion of the bar in the vicinity of the arc is completely fused and is united with the two steel tubes but remains substantially independent of the chilling strip, and thereafter removing said chilling strip.

6. A method of longitudinally welding together in an impervious manner two parallel, spaced, thin walled steel tubes comprising the steps of positioning a steel filler bar in said space which substantially fills the same and which is backed up by and in contact with a metallic backing strip which spans said space and is composed of a material having a sufficiently high melting point and thermo-conductivity so as to prevent said strip from becoming fused when in direct contact with said bar for limited periods of time and while said bar is in a molten state, striking an arc between a welding electrode and the side of the filler bar opposite the backing strip thereby completely fusing said bar in the vicinity of said arc and forming a molten pool in said vicinity which is composed of both bar metal and electrode metal, moving said arc along the length of the filler bar at a rate so as to form said molten pool along the length of the filler bar and cause the fused metal to unite with the two steel members but remain substantially independent of the backing strip, and removing said backing strip after solidification of the fused metal.

7. A method of longitudinally joining a pair of thin walled steel tubes by welding which comprises positioning the tubes in parallel closely spaced relation, inserting a steel filler bar intermediate the tubes and substantially filling the space therebetween and which is backed up by a copper chilling strip which extends longitudinally of the bar and spans the space between the tubes and is in engagement with said tubes, striking an arc between a welding electrode and the side of the filler bar opposite the chilling strip, moving said arc along said bar at a rate such that the portion of the bar in the vicinity of the arc is completely fused and is united with the two steel tubes but remains substantially independent of said chilling strip, and thereafter removing said chilling strip.

8. A method of welding together two parallel spaced, thin walled steel tubes continuously along their adjacent longitudinal portion comprising substantially completely spanning the space between said tubes with a steel bar of rectangular section backed up by a backing strip extending longitudinally of said space and which is maintained in spaced relation with said bar, said backing strip being capable of being in direct contact with said bar for a limited period of time when said bar is in a molten state without itself becoming fused, applying a localized welding heat directly to the bar from the side opposite said backing strip, moving said localized welding heat longitudinally of said bar at a rate such that the portion of the bar in the vicinity of the heat is completely fused and is united with the two tubes but remains substantially independent of said backing strip, and thereafter removing said backing strip.

9. A method of welding together two parallel spaced thin walled steel tubes continuously along their adjacent longitudinal portions comprising substantially completely spanning the space between said tubes with a steel bar of rectangular section backed up by a backing strip extending longitudinally of said space and which is maintained in spaced relation with said bar, with said space between the bar and the backing strip having a welding flux of the type employed in submerged arc welding disposed therein, said backing strip being capable of being in direct contact with said bar for a limited period of time when said bar is in a molten state without itself becoming fused, applying a localized welding heat directly to the bar from the side opposite said backing strip, moving said localized welding heat longitudinally of said bar at a rate such that the portion of the bar in the vicinity of the heat is completely fused and is united with the two tubes but remains substantially independent of said backing strip, and thereafter removing said backing strip.

10. A method of longitudinally joining a pair of thin walled steel tubes by welding which comprises positioning the tubes in parallel relatively closed spaced relation, substantially completely spanning the space between said tubes with a steel bar of rectangular section backed up by a backing strip extending longitudinally of said space and in spanning relation with said space and which is maintained in predetermined spaced relation with said bar by a plurality of steel members having small areas of contact with the bar and the backing strip, said backing strip being capable of being in direct contact with the bar for a limited period of time when said bar is in a molten state without itself becoming fused, striking an arc between a welding electrode and the side of the filler bar opposite said backing strip, moving said arc along said bar at a rate such that the portion of the bar in the vicinity of the arc is completely fused and is united with the two steel tubes but remains substantially independent of the backing strip and thereafter removing said backing strip.

11. A method of welding together two parallel spaced, thin walled steel tubes continuously along their adjacent longitudinal portions comprising substantially completely spanning the space between said tubes with a steel bar of rectangular section backed up by a copper backing strip extending longitudinally of said space in contact with said tubes and in spanning relation with said space and which is maintained in predetermined spaced relation with said bar by a plurality of steel members having small areas of contact with the bar and the backing strip with the space thus formed between said bar and said backing strip having a welding flux of the type employed in submerged arc welding disposed therein, striking an arc between a welding electrode and the side of the filler bar opposite said backing strip, moving said arc along said bar at a rate such that the portion of the bar in the vicinity of the arc is completely fused and is united with the two steel tubes but remains substantially independent of the backing strip and thereafter removing said backing strip.

12. A method of welding together two steel members having spaced parallel surfaces, said welding continuously joining said surfaces, comprising the steps of substantially completely spanning the space between said surfaces with steel backed up by a backing strip extending longitudinally of said space and in spanning relation with said space, said backing strip being capable of being in direct contact with said steel for a limited period of time when said steel is in a molten state wtihout itself becoming fused, applying a localized welding heat directly to the steel between said surfaces from the side of the space opposite said backing strip, moving said localized welding heat longitudinally of said space along said steel at a rate such that the portion of the steel in the vicinity of the heat is completely fused and is united with the two steel tubes but remains substantially independent of said backing strip, and thereafter removing said backing strip.

13. The method of claim 12 wherein the backing strip is copper.

References Cited in the file of this patent
UNITED STATES PATENTS

| | | |
|---|---|---|
| 1,589,017 | Lincoln | June 15, 1926 |
| 2,206,375 | Swift | July 2, 1940 |